United States Patent
Norrell et al.

[11] Patent Number: 5,999,109
[45] Date of Patent: Dec. 7, 1999

[54] FRAME-BASED SPECTRAL SHAPING METHOD AND APPARATUS

[75] Inventors: Andrew L. Norrell, Nevada City, Calif.; Vladimir G. Parizhsky, Chicago, Ill.; Scott A. Lery, Nevada City, Calif.; Mark A. Waldron, Gurnee, Ill.

[73] Assignee: 3Com Corporation, Santa Clara, Calif.

[21] Appl. No.: 08/871,220

[22] Filed: Jun. 9, 1997

[51] Int. Cl.[6] .................................................. H03M 5/00
[52] U.S. Cl. .............................. 341/58; 341/50; 341/76; 341/95
[58] Field of Search ................................ 341/50, 58, 76, 341/95

[56] References Cited

U.S. PATENT DOCUMENTS

| | | | |
|---|---|---|---|
| 5,365,231 | 11/1994 | Niimura et al. | 341/58 |
| 5,602,547 | 2/1997 | Maeno et al. | 341/58 |
| 5,801,695 | 9/1998 | Townshend. | |
| 5,809,075 | 9/1998 | Townshend | 375/254 |
| 5,825,824 | 10/1998 | Lee et al. | 375/292 |
| 5,835,538 | 11/1998 | Townshend. | |
| 5,859,872 | 1/1999 | Townshend. | |

FOREIGN PATENT DOCUMENTS

| | | |
|---|---|---|
| WO 96/18261 | 6/1996 | WIPO. |
| WO 98/20656 | 5/1998 | WIPO. |
| WO 98/37657 | 8/1998 | WIPO. |
| WO 98/45970 | 10/1998 | WIPO. |

OTHER PUBLICATIONS

International Search Report, PCT/US98/15114, mailed Feb. 1, 1999.

*Primary Examiner*—Michael Tokar
*Assistant Examiner*—Anh Q Tran
*Attorney, Agent, or Firm*—McDonnell Boehnen Hulbert & Berghoff

[57] ABSTRACT

An improved DC compensation method for use in conjunction with telephony signalling. The method includes defining a frame that includes at least two n-bit codewords. An unsigned codeword is then identified within the frame by applying a rule to the codewords in the defined frame. Next, a sign bit is appended to the unsigned codeword, thereby producing a DC compensating codeword. The sign bit is selected based upon a weighting function of the linear values associated with previously transmitted codewords. The remaining unsigned codewords in the frame are assigned sign bits from user data.

15 Claims, 5 Drawing Sheets

DC COMPENSATION METHOD:
SIGN BIT STOLEN FROM FIXED POSITION IN FRAME OF SIZE 6

FIG. 3B

DC COMPENSATION METHOD:
SIGN BIT STOLEN FROM FIXED POSITION IN FRAME OF SIZE 6

FRAME-BASED SPECTRAL SHAPING METHOD AND APPARATUS

BACKGROUND OF THE INVENTION

The present invention relates to data communication over subscriber lines and, more particularly, to high speed data communication over such lines. A frame-based spectral shaping method and apparatus may be utilized to suppress very low frequency and DC energy in the communicated data.

A data communication system includes an encoder that is digitally connected to a digital portion of the general switched telephone network. A data source provides an input to the encoder. A subscriber is located at the opposite end of the communication system. The subscriber is typically connected to the general switched telephone network by a twisted pair of wires, commonly known as an analog loop.

In such a system, information may be communicated from the data source to the subscriber as follows. Information from the data source is converted into a series of digital codewords by the encoder. The digital codewords pass in digital form from the encoder through the digital portion of the telephone network. At an interface between the digital portion of the telephone network and the analog loop, the series of codewords is converted into an analog voltage waveform by a digital-to-analog converter. A decoder located at the subscriber end of the analog loop receives a distorted version of the analog voltage waveform and reconstructs the series of codewords from the waveform. The information from the data source may then be extracted from the reconstructed series of codewords.

For communication in the opposite direction, information at the subscriber end may be modulated and transmitted in analog form over the analog loop. At the interface between the analog loop and the digital portion of the telephone network, the analog signal is converted into a series of codewords by an analog-to-digital converter. The codewords are transmitted from the interface to the data source, where they are demodulated and the information is recovered.

Various standards have been adopted throughout the world for the analog-to-digital and digital-to-analog conversions performed by the telephone network. The United States, for example, uses a conversion scheme in which the analog-to-digital converter in the interface samples the analog signals at the rate of 8000 samples per second and maps the samples into one of 255 possible distinct codewords. The 255 codewords correspond to quantization levels defined by a non-linear mapping rule called the $\mu$-law companding rule, which is the Pulse Code Modulation ("PCM") voice coding and companding standard in North America and Japan. In Europe, the A-law companding rule is used. The codeword chosen for each analog sample corresponds to the quantization level that is closest to the voltage of the analog sample. The digital-to-analog converter in the interface performs the inverse of this mapping, i.e. each codeword utilized by the digital portion of the telephone network is associated by the digital-to-analog converter with an analog voltage.

Figure 1:
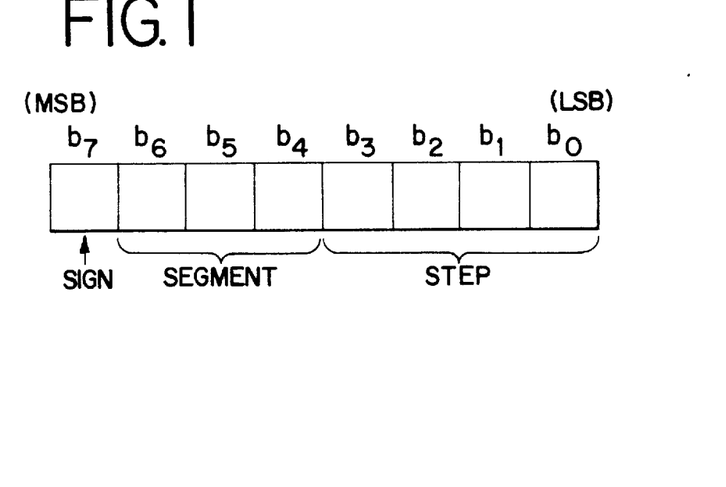
FIG. 1 shows a bit allocation map for a $\mu$-law codeword.

The codewords utilized by the digital portion of the general switched telephone network are typically eight bit codewords. FIG. 1 shows a bit allocation map for a $\mu$-law codeword. In the eight bit codeword, the most significant bit, $b_7$, is a sign bit. The next three bits, $b_6$ through $b_4$, identify one of eight segments in the $\mu$-law quantization characteristic. The last four bits, $b_3$ through $b_0$, identify one of sixteen steps within that segment. The bit locations $b_6$ through $b_0$ may be referred to herein as the magnitude field of the eight bit codeword.

The general switched telephone network utilizes DC signals on analog loops to power telephone handsets and to signal when the handset, or other customer equipment such as a modem, goes off hook. The off hook signal indicates that the customer equipment is connected to the analog loop. Accordingly, it is desirable to design customer equipment that may be connected to analog loops, such as modems, answering machines and the like, to separate telephony signalling from DC network signalling. In modems, for example, it is common to use isolation transformers and capacitors to block low frequency signals.

With respect to telephony signalling, it has been observed that very low frequency signals suffer greater harmonic distortion in analog loop circuits than do higher frequencies. In addition, very low frequency components in a telephony signal may cause very long echo impulse response, thereby increasing the complexity of echo cancellation. It is therefore desirable to reduce DC and very low frequency components in telephony signals.

A device is known that compensates for a DC component in transmitted data by altering a stream of, for example, $\mu$-law codewords. In U.S. patent application Ser. No. 08/352,651, which is incorporated herein by reference, Townshend shows a DC eliminator for use in an encoder. The encoder converts a data stream into a stream of codes, which may be transmitted over a telephone network to a subscriber. The subscriber may be connected by an analog loop to a digital portion of the telephone network. The encoder has a digital connection to the digital portion of the telephone network. At an interface between the analog loop and the digital portion of the telephone network, a telephone network digital-to-analog converter converts the stream of codes into an analog voltage waveform. The DC eliminator in the encoder may function to alter the stream of codes, as described below, so that the analog voltage waveform does not have a DC component.

Figure 2:
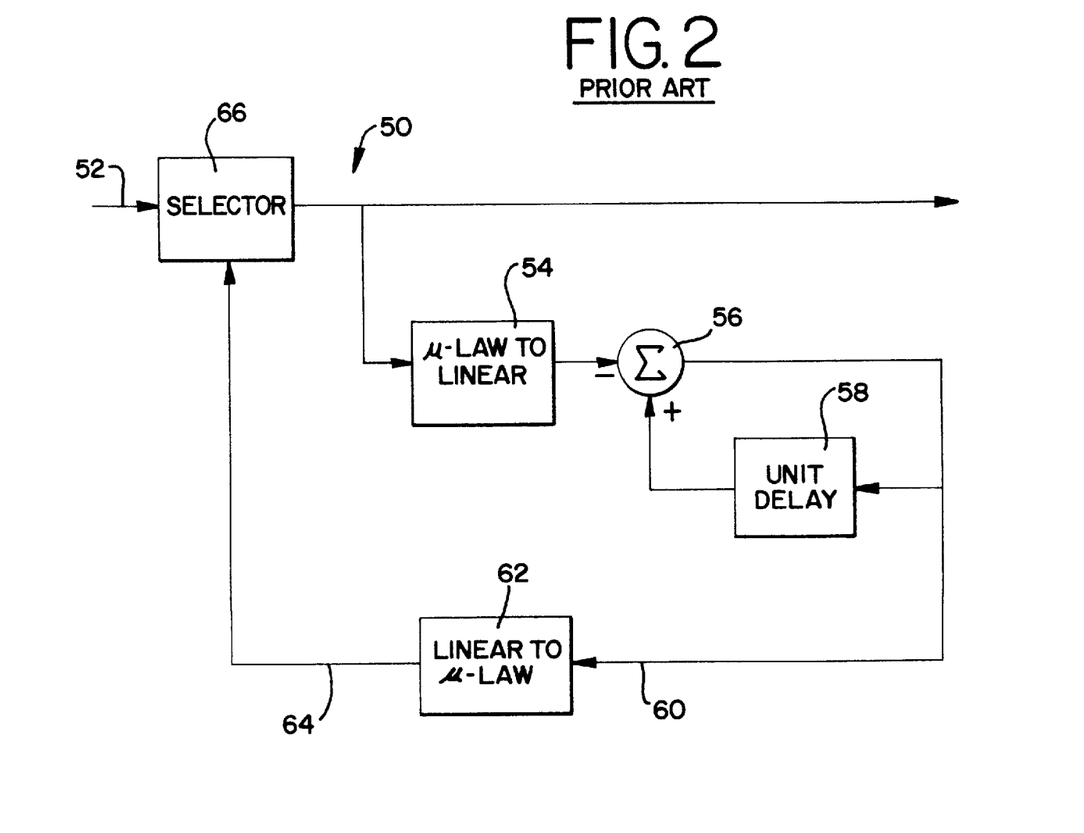
FIG. 2 is a functional block diagram of a known DC eliminator.

A functional block diagram of the Townshend DC eliminator 50 is shown in FIG. 2. In the DC eliminator shown by Townshend, the code stream 52 is converted by converter 54 to linear values, which are accumulated and negated by a summer 56 and a unit delay 58 to form a DC offset signal 60. The DC offset signal is applied to a converter 62 that produces a DC restoration code 64. A two-input selector 66 then chooses an output code from one of the code stream 52 and the DC restoration code 64.

In an operational mode of the DC eliminator shown by Townshend, the two-input selector 66 outputs seven sequential values from the code stream 52 followed by one value of the DC restoration code 64.

A disadvantage of the DC eliminator shown by Townshend is the cost of the DC elimination in terms of data rate. For example, if each code is the same bit length and one in every eight transmitted codes is a DC restoration code, which carries no data, then the data rate for such a system may not exceed seven-eighths of its potential value. It is desirable to minimize the cost of DC elimination on the data rate of the system.

In accordance with an alternative known method for DC suppression, the sign bit, such as the bit $b_7$ shown in FIG. 1, of every nth codeword is commandeered to suppress the DC content of the analog voltage waveform. A stream of codewords may be converted to a series of linear values, which are accumulated by a summer. The encoder may then modify the stream by inserting a sign bit into every nth codeword, where the value of the sign bit (positive or negative) is selected to oppose the sign of the value accumulated by the summer. The value accumulated by the summer may then be reduced (if the value accumulated by the summer is positive) or increased (if the value accumulated by the summer is negative) by the value of the nth codeword. In terms of retrieving data at the decoder, the decoder simply ignores the sign bit of every nth codeword.

Figure 3A:
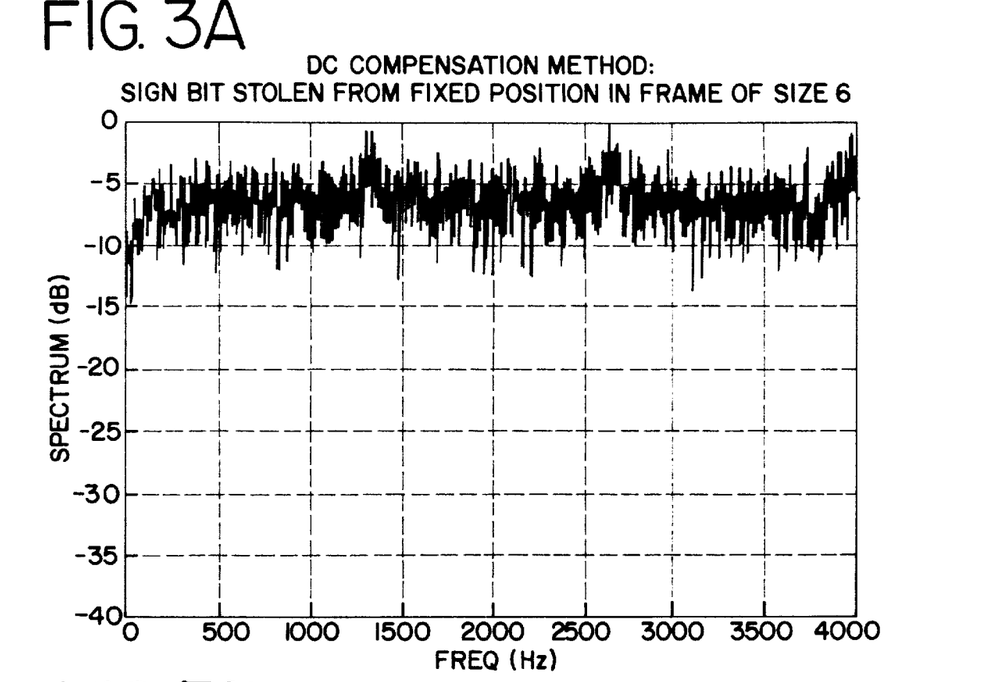
FIGS. 3A and 3B show a simulated spectral output of an encoder that commandeers the sign bit of every sixth codeword for purposes of DC suppression.
Figure 3B:
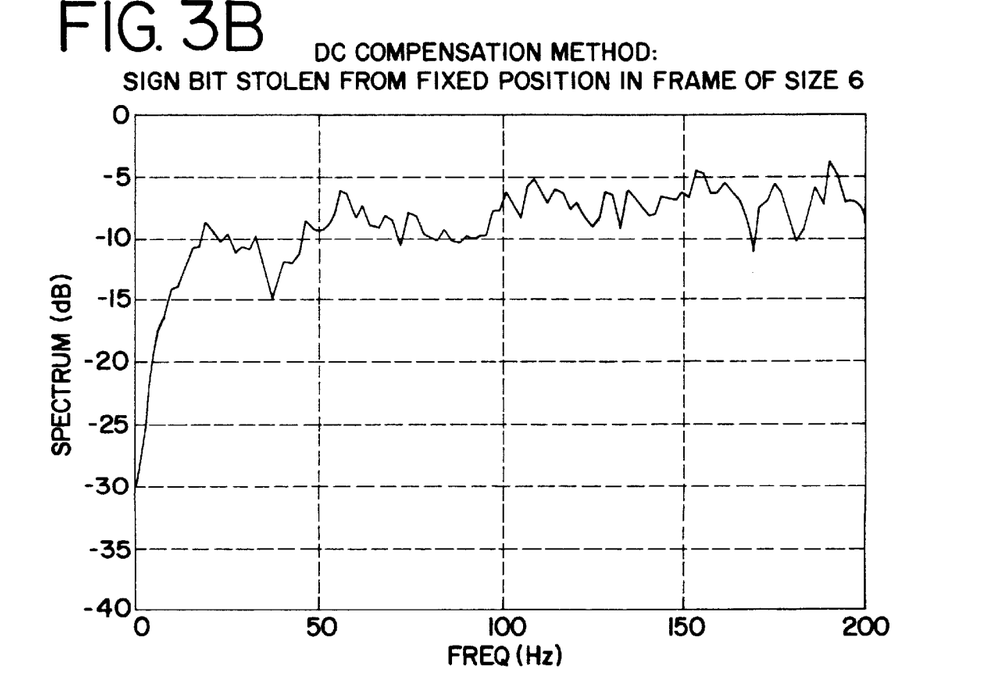

FIGS. 3A and 3B show a simulated spectral output of an encoder that commandeers the sign bit of every sixth codeword for purposes of DC suppression. In FIG. 3A, the entire frequency band from 0 Hz to 4000 Hz is shown. FIG. 3B provides an expanded view of the 0 Hz to 200 Hz range from FIG. 3A.

A disadvantage of this method is that the magnitude of the DC suppression codes, i.e. the magnitude of every nth codeword, depends upon the random value of the data bits in the magnitude field of every nth codeword. If the magnitude of a DC suppression code is small in comparison to the value accumulated by the summer, then the spectral modification of the resulting analog voltage waveform will be suboptimal. A further disadvantage of this method is that the periodic location of the commandeered sign bit may introduce spectral peaks in the output of the encoder, such as the spectral peaks shown in FIG. 3A.

It would therefore be desirable to have an improved DC compensation method and apparatus.

BRIEF DESCRIPTION OF THE DRAWINGS

The arrangement and operation of this invention can be clearly understood by considering the following detailed description of the presently preferred embodiments in conjunction with the accompanying drawings, in which.

DETAILED DESCRIPTION OF THE PRESENTLY PREFERRED EMBODIMENTS

Figure 4:
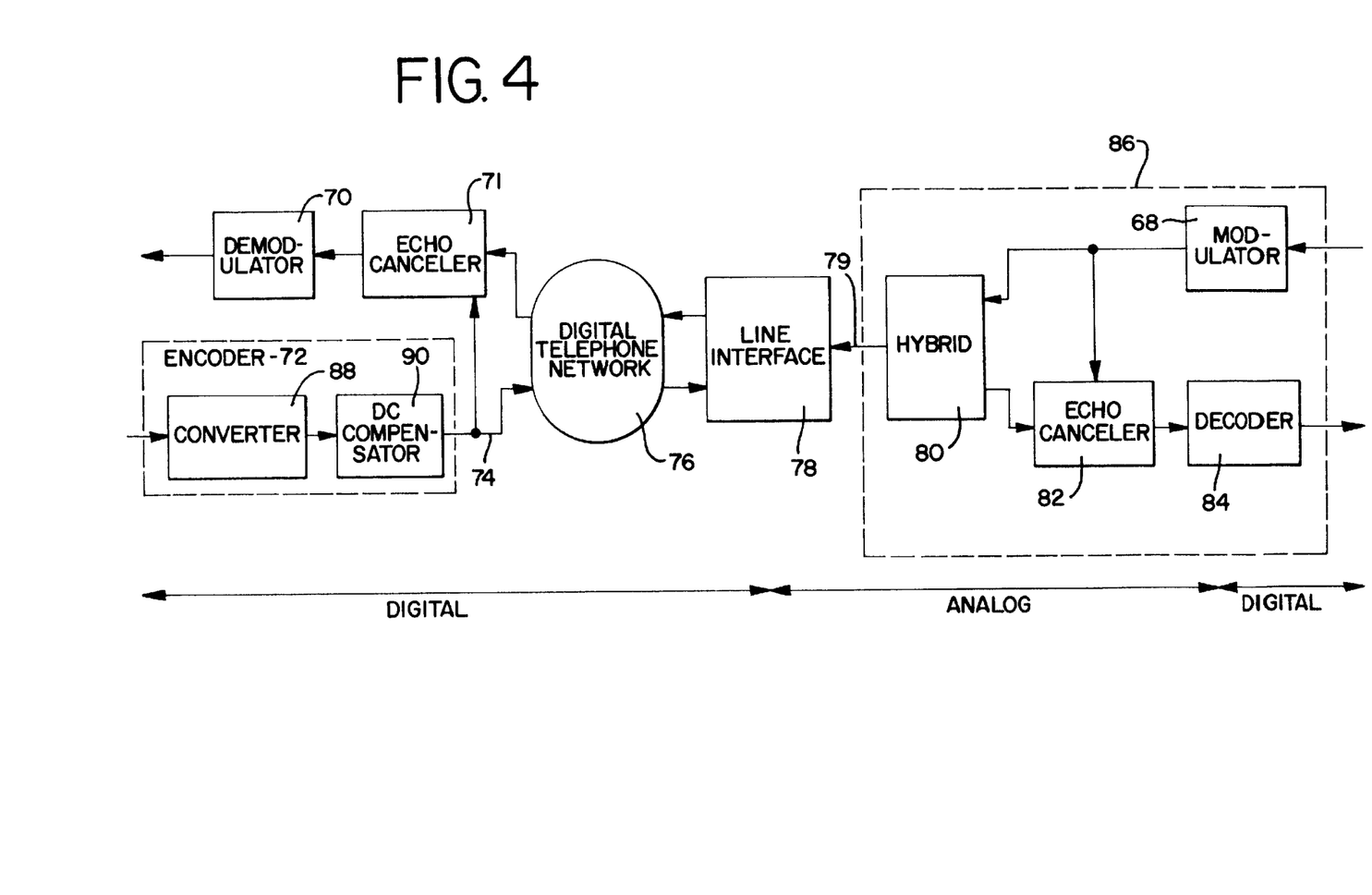
FIG. 4 is block diagram of a communication system having a DC compensator in accordance with the present invention.

The presently preferred embodiments of the present invention will now be described with reference to FIGS. 4 through 6, in which like elements are referred to by like numerals. FIG. 4 is a block diagram of a communication system that may utilize the frame-based DC compensation method and apparatus of the present invention. The communication system has a forward channel, which includes an encoder 72 that is connected to a decoder 84, and a reverse channel, which includes a modulator 68 that is connected to a demodulator 70, as shown in FIG. 4.

With respect to communication in the forward channel, a data source provides information to the encoder 72, which has a digital connection 74 to a digital telephone network 76. The digital telephone network 76 is coupled by a line interface 78 to a subscriber line 79, such as a two-wire analog loop. The subscriber line 79 is coupled to a client device 86 having a hybrid 80. The hybrid 80 is connected to the echo canceler 82 and the decoder 84, which are illustrated within the client device 86 in FIG. 4.

The line interface 78 is a conventional device that, in the forward channel, includes a digital-to-analog converter, which in North America operates in accordance with the $\mu$-law companding rule. In the reverse channel, the line interface 78 includes an analog-to-digital converter, which operates in accordance with the companding rule utilized by the digital-to-analog converter. The line interface 78 may be referred to as a PCM codec.

The digital-to-analog converter and the analog-to-digital converter in the line interface 78 may alternatively operate in accordance with a different rule, such as the European A-law companding rule or a linear conversion rule. The significance of the particular rule that is used by the line interface 78 lies only in understanding that the rule defines the set of codewords that will be utilized by the digital telephone network 76 and, therefore, defines the set of codewords that may be utilized by the encoder 72.

For communication in the forward channel, the encoder 72 receives information from the data source and converts the information into a digital format that is compatible with the digital telephone network 76. Preferably, the digital format produced by the encoder 72 is a format that is used by the digital telephone network 76, such as a stream of $\mu$-law codewords. The $\mu$-law codewords, which may be referred to herein as PCM codewords, typically take the form that is shown in FIG. 1.

The PCM codewords pass, without conversion to analog form, from the encoder 72 through the digital telephone network 76 to the line interface 78. In addition, an echo canceler 71 scales the outgoing PCM codewords from the encoder 72 and subtracts from the incoming PCM codewords a scaled value obtained from the outgoing PCM codewords to account for imperfections in the line interface 78.

When the outgoing stream of PCM codewords reach the line interface 78, the PCM codewords are converted, as described above, into a series of analog voltages, which series is also referred to herein as an analog voltage waveform. The series of analog voltages is transmitted over the subscriber line 79 to the client device 86.

At the decoder 84 in the client device 86, the series of analog voltages is converted by an analog-to-digital converter into the digitally formatted information. The decoder 84 in the client device 86 extracts the information, originally transmitted by the data source, from the digitally formatted information. The information may then be sent to a data terminal device, such as a computer, that is coupled to the client device 86. The client device 86 may alternatively be incorporated into the data terminal device.

As shown in FIG. 4, the encoder 72 includes a converter 88 and a DC compensator 90. The converter 88 transforms information from the data source, whatever its format, into a series of n-bit data codewords. Typically, the information will be serial digital data and the digital telephone network will utilize a set of eight-bit $\mu$-law codewords, as shown in FIG. 1. In such case, the converter 88 is preferably an eight bit serial-to-parallel converter (n=8), which converts the input data into a series of eight-bit $\mu$-law codewords. The DC compensator 90 modifies the series of n-bit data codewords that are produced by the converter 88 to create spectral nulls in the in the analog voltage waveform that will be generated at the line interface 78 in response to the series of n-bit data codewords.

The n-bit data codewords from the encoder 72 are converted in the forward channel of the communication system to analog voltage samples or to numerical representations of analog voltages (e.g., digital words) according to a conversion rule, such as linear conversion, or a companding rule, such as μ-law or A-law companding. Each of the analog voltage samples or numerical representations thereof is associated with one of the n-bit codewords in accordance with the particular conversion rule. For example, in the communication system shown in FIG. 4, the codewords are converted to analog voltage samples at the line interface 78.

In accordance with a preferred embodiment of the present invention, the encoder 72 is operable to create spectral shaping, such as spectral nulls, in the resulting analog voltage waveform that is generated by the line interface 78 in response to the series of n-bit data codewords transmitted by the encoder 72. For example, it is desirable to minimize the DC component in the resulting analog voltage waveform for the communication system shown in FIG. 4.

Spectral shaping is accomplished in a preferred embodiment of the present invention by modifying the n-bit data codewords produced by the converter 88. Certain of the bits in some of the n-bit codewords, therefore, do not carry data. Rather, the certain bits are used to produce the desired spectral modification of the resulting analog voltage waveform. Preferably, the certain bits are chosen in accordance with a rule that is known to the encoder 72 and the decoder 84. The decoder 84 then applies the rule to recover the data bits in the n-bit codewords from the analog voltage waveform. Because the data transfer rate decreases as the number of bits used for spectral shaping increases, it is preferable to minimize the number of bits that are used for spectral shaping.

For purposes of applying the spectral shaping rule, the encoder 72 and the decoder 84 may group the n-bit codewords into frames, which for example may be formed from a predetermined number of consecutive codewords. The encoder 72 and the decoder 84 know which of the codewords in each frame are modified in accordance with the spectral shaping rule by examining the data bits in the unmodified field of each codeword in the frame and identifying the modified codeword by applying the rule.

In a preferred embodiment, only one codeword per frame is modified. Preferably, the sign bit of the n-bit codeword may be selected to achieve the desired spectral modification, as described below. The remaining bits in the frame advantageously may be utilized to transmit data.

The desired spectral modification may be a spectral null or near null. In the communication system shown in FIG. 4, a spectral null or near null is preferably located at zero frequency (DC). The n-bit codewords may be eight bit μ-law or A-law companded PCM codewords. The analog voltage samples may be the signals produced at the output of a PCM codec, such as may be found in the line interface 78.

For communication in the reverse channel, the client device 86 may convert a data stream into an outgoing analog signal by the modulator 68 in accordance with known modem techniques. The analog signal is coupled by the hybrid 80 to the line interface 78, where the analog signal is converted into a series of codewords. The digital telephone network 76 transfers the series of codewords to the demodulator 70. The demodulator 70 then converts the series of codewords into the data stream.

The echo canceler 82 scales the outgoing analog signal from the modulator 68 and subtracts it from the incoming analog voltage waveform in a known manner. For the asymmetric communication system shown in FIG. 4, the echo canceler 82 is preferably as described in U.S. Pat. No. 5,579,305, issued to U.S. Robotics, Inc., which is incorporated herein by reference.

The DC compensator 90 shown in FIG. 4 will now be described with reference to FIG. 5. Preferably, the DC compensator 90 operates upon the series of codewords supplied by the converter 88 on a frame-by-frame basis. Instead of defining a strictly periodic DC suppression sample time, such as every nth codeword, the preferred embodiments preferably define a frame and select an appropriate DC compensating sample within the frame. For example, the frame may be defined as a series of six samples, which may also be referred to herein as symbols or codewords. Other frame definitions may alternatively be used without departing from the present invention. In particular, the defined frame is not limited to a number of consecutive samples, but may include any grouping of samples that is known to the encoder 72 and the decoder 84.

Within the defined frame, one bit is utilized for purposes of spectral shaping, which in the example described herein is DC compensation. A spectral shaping rule, which is known to the encoder 72 and the decoder 84, identifies the codeword within the frame that will have a bit usurped. In accordance with a presently preferred embodiment, the utilized bit within the frame corresponds to the sign bit associated with a sample that the decoder may uniquely identify. Preferably, the DC compensating sign bit is appended to the sample whose magnitude field produces the first largest magnitude linear or analog signal after de-companding. The decoder may then identify the DC compensating codeword within the frame by comparing all of the samples within the frame. More particularly, the decoder may compare the magnitude field associated with each codeword within the frame to identify the DC compensating codeword.

The sample or PCM codeword within the defined frame whose magnitude field produces the largest magnitude linear or analog signal may be referred to herein as the largest sample. Accordingly, the first largest sample means the first sample, in order of occurrence within the frame, having the largest magnitude field, where more than one sample in the frame may have the same largest magnitude field. Because of bit inversions introduced by the digital telephone network 76, the largest sample may actually be the sample or PCM codeword corresponding to the smallest binary number. In the same manner, the "second largest sample," as used herein, is the second occurring sample in the frame having the same largest magnitude field. Thus, the rule includes a tie-breaker provision for a frame having more than one sample with the same magnitude field, where that magnitude field happens to be the largest magnitude field within the frame.

Figure 5:
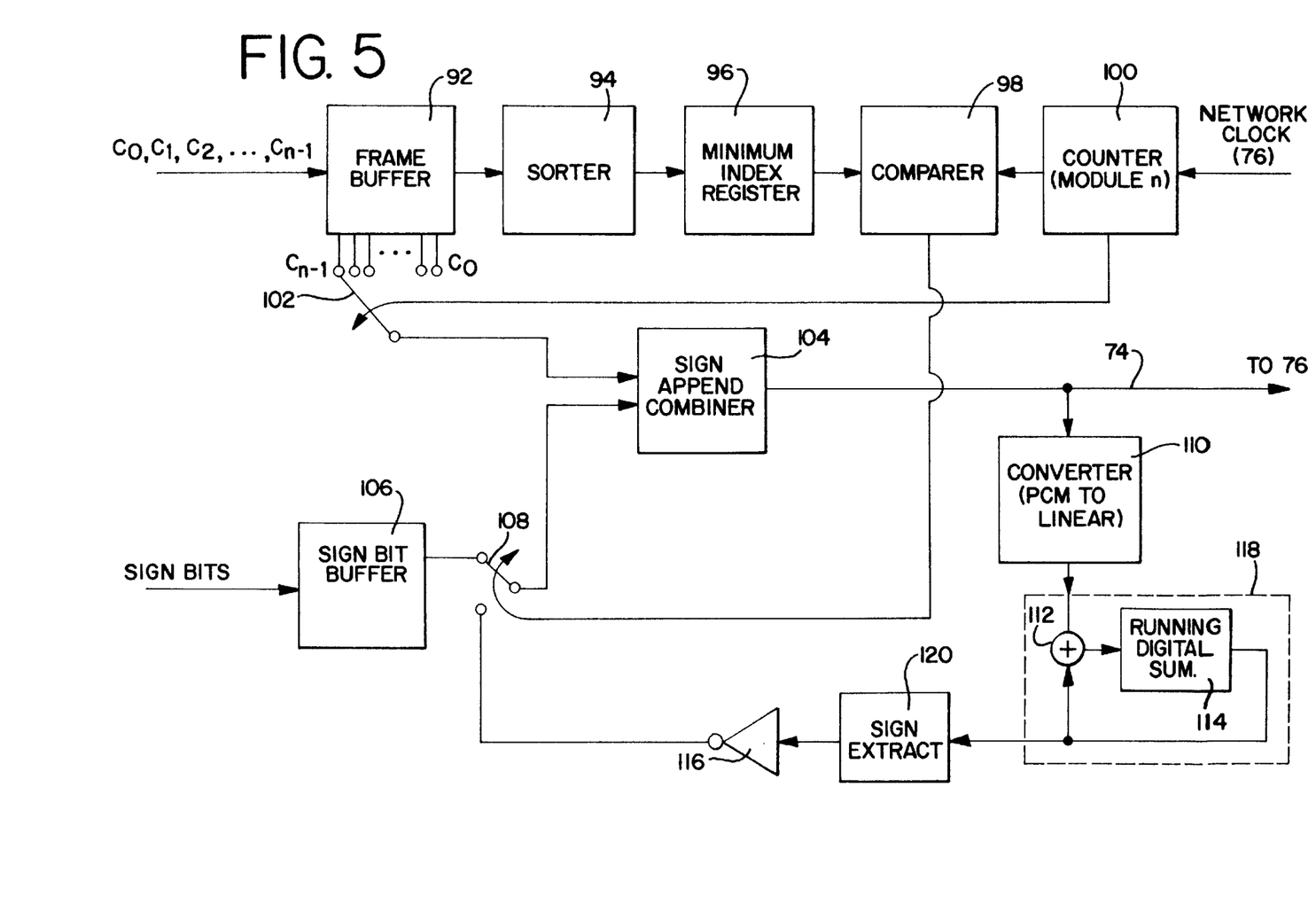
FIG. 5 is a functional block diagram of the DC compensator shown in FIG. 4.

FIG. 5 is a functional block diagram of the DC compensator 90 shown in FIG. 4 in which the DC compensator 90 is designed for the case in which the frame is defined as a number, n, of successive codewords and the rule is that the DC compensating codeword is the first largest codeword within the frame. Alternative designs may be used to implement this spectral shaping rule, and those designs will become apparent to those skilled in the art upon reviewing this detailed description.

Referring to FIG. 5, a frame buffer 92 is coupled to receive a series of n unsigned PCM codewords, $c_0$, $c_1, \ldots, c_{n-1}$. The frame buffer 92 is coupled to a sorter 94, whose output is provided to a minimum index register 96. The minimum index register 96 is coupled to a comparer 98. The comparer 98 also receives an input from a counter 100.

The counter 100 is preferably a modulo n counter, which receives a clock signal from the digital telephone network 76. The clock signal from the digital telephone network typically has a clock frequency of 8000 Hz.

The counter 100 controls the state of an n-position switch 102, which causes the n unsigned codewords, $c_0, c_1, \ldots, c_{n-1}$, to be sequentially read out of the frame buffer 92 and provided to a sign append combiner 104 through a first input. A second input to the sign append combiner 104 is provided through a 2-position switch 108. The state of the 2-position switch 108 is controlled by the comparer 98. In a first position, the 2-position switch 108 connects a sign bit buffer 106 to the sign append combiner 104. In a second position, the 2-position switch 108 connects the output of an inverter 116 to the sign append combiner 104.

The output of the sign append combiner 104 is coupled by the digital connection 74 to the digital telephone network 76. Thus, the output of the sign append combiner 104 is the output of the encoder 72 shown in FIG. 4. As shown in FIG. 5, the codewords outputted from the sign append combiner 104 are also provided to a converter 110. The converter 110 is preferably a PCM-to-linear converter, which emulates the digital-to-analog conversion rule applied by the line interface 78 shown in FIG. 4.

An integrator 118 is coupled to the converter 110. The integrator 118 includes a summer 112 and a buffer 114. The integrator 118 calculates a running digital sum ("RDS") of the linear values provided by the converter 110 by adding a linear value to the RDS each time that a PCM codeword is transmitted to the digital telephone network 76. The sign bit of the RDS is provided by a sign extractor 120, which is coupled to the integrator 118. The output of the sign extractor 120 is coupled to the inverter 116.

The DC compensator 90 shown in FIG. 5 operates as follows, where n is assumed to be 6. For n=6, the encoder 72 encodes data in frames having six PCM codewords per frame. First, the frame buffer 92 collects six unsigned PCM codewords, $c_0, c_1, \ldots, c_5$. Initially, the encoding is magnitude only—no sign bits are assigned yet. Thus, the PCM codewords, $c_0, c_1, \ldots, c_5$, will fall in the range of 128–255.

Next, the sorter 94 preferably selects the first largest sample from the PCM codewords, $c_0, c_1, \ldots, c_5$, stored in the frame buffer 92. As noted above, the largest sample will closely correspond to the largest resulting linear value produced by the PCM codewords, $c_0, c_1, \ldots, c_5$, when the samples later reach the line interface 78. Slight deviations may be introduced by the digital telephone network 76. For example, robbed bit signalling may alter the least significant bit of the PCM codewords. The index of the elected PCM codeword is stored in the minimum index register 96. As used herein, the "index" of a codeword corresponds to the location of the codeword within the frame Buffer 92. Concurrently, five (n-l) sign bits are differentially encoded and stored in the sign bit buffer 106.

At this point, signed PCM codewords are assembled and transmitted to the digital telephone network 76 at the rate of one PCM codeword for each 8000 Hz clock period of the digital telephone network 76. One unsigned PCM codeword, from the PCM codewords, $c_0, c_1, \ldots, c_5$, stored in the frame buffer 92, is provided to the sign append combiner 104 for each clock period under the control of the counter 100 and the switch 102. In addition, for each period of the digital telephone network clock, the comparer 98 compares the index stored in the minimum index register 96 to the value of the counter 100. If the index does not equal the value of the counter 100, then the comparer 98 sets the switch 108 to provide a bit from the sign bit buffer 106 to the sign append combiner 104. If, on the other hand, the index equals the value of the counter 100, then the comparer 98 sets the switch 108 to provide a sign bit from the inverter 116 to the sign append combiner 104, thereby producing a DC compensating codeword. The inverter 116 provides a sign bit that is opposite to the sign bit associated with the RDS in the integrator 118. In either case, the PCM codeword assembled at the sign append combiner 104 is transmitted to the digital telephone network 76.

Each PCM codeword that is transmitted to the digital telephone network is also processed by the converter 110 so that the RDS is updated. Preferably, the RDS is continuously calculated from frame to frame without being reset.

In accordance with an alternative preferred embodiment of the present invention, the foregoing description of the operation of the DC compensator 90 is altered as follows. Rather than taking the inverted sign of the RDS when the index equals the value of the counter 100, in which case the RDS accounts only for PCM codewords previously transmitted, the RDS is initially extended to the end of the 6 codeword frame stored in the frame buffer 92. The extended RDS is computed two ways to produce two hypotheses: first, the extended sum is computed assuming that a sign bit of −1 is appended to the largest sample; and second, the extended sum is computed assuming that a sign bit of +1 is appended to the largest sample. Next the two hypotheses are compared to determine which hypothesis provides the lowest absolute value of RDS extended to the end of the frame in process. The sign bit of the first largest unsigned PCM codeword is then set to match the hypotheses that produced the lowest absolute value RDS. This alternative preferred embodiment provides improved DC compensation without a significant increase in computational complexity.

In accordance with a further alternative preferred embodiment of the present invention, the foregoing description of the operation of the DC compensator 90 is altered as follows. Rather than buffering a single frame, the frame buffer 92 buffers multiple frames. The sorter 94 may then identify, and store in the minimum index register 96, indices corresponding to the first largest sample in each frame. An extended running digital sum is computed for all of the PCM codewords in the frame buffer 92 along with the previously transmitted PCM codewords. Then, $2^N$ hypotheses are formed by examining all possible combinations of the extended RDS, in which for the first largest sample in each frame the sign bit is assumed to be either +1 or −1, where N is the number of frames buffered in the frame buffer 92. The combination that yields the best, i.e. minimum, extended RDS for the N buffered frames is selected.

For example, if the above-described method is extended to look ahead to the next frame, then the frame buffer 92 buffers two frames of unsigned codewords (N=2). The resulting four hypotheses are:

R00=|W0·(RDS+DS00)+W1·DS10|
R01=|W0·(RDS+DS00)+W1·DS11|
R10=|W0·(RDS+DS01)+W1·DS10|
R11=|W0·(RDS+DS01)+W1·DS11|, where RDS is the running digital sum associated with the previously transmitted PCM codewords, DS00 is the digital sum of the first frame in the frame buffer 92 assuming that the sign bit for the first largest sample in the first frame is set to −1, DS10 is the digital sum of the second frame in the frame buffer 92 assuming that the sign bit for the first largest sample in the second buffered frame is set to −1, DS01 is the digital sum of the first frame in the frame buffer 92 assuming that the sign bit for the first largest sample in the first buffered frame is set to +1, DS11 is the digital sum of the second frame in the frame buffer 92 assuming that the sign bit for the first largest sample in the second frame is set to +1, W0 is a weighting factor assigned to the first frame in the frame buffer 92, and W1 is a weighting factor assigned to the second frame in the frame buffer 92. In accordance with a preferred embodiment, W0=2 and W1=1. Other weighting factors may alternatively be used.

The sign bit for the first largest sample in the first buffered frame is determined by whichever is the minimum of R00, R01, R10 and R11. If the minimum is R00 or R01, then the sign bit is set to −1. Otherwise, the sign bit is set to +1.

This method may be further extended to include more than two frames, with an appropriate weighting function, although with resulting additional complexity in terms of computation. For most applications, however, two frames provide an acceptable balance between performance and complexity. In addition, although the methods described above utilize the minimum absolute value of RDS and the minimum absolute value of R, those skilled in the art will appreciate that other selection criteria may be used. For example, one may select the appropriate sign bit by utilizing a minimum mean sum of the squares calculation, a minimum peak calculation or the like. Moreover, a linear combination of past (and future with the look ahead technique) samples may be used as an alternative to the running digital sum.

As described above, the DC compensator 90 produces no more than one DC compensating codeword per frame. In accordance with the presently preferred embodiments, only the sign bit of the DC compensating codeword is usurped for purposes of spectral shaping; the magnitude field of the DC compensating codeword contains data bits. As such, the overhead associated with the preferred embodiments of the DC compensation method and apparatus described herein is advantageously limited to one bit per frame.

The encoder 72 and decoder 84 are preferably constructed as described in U.S. patent application Ser. No. 08/352,651, with the exceptions that the DC compensator 90, as described above, replaces the DC eliminator shown in U.S. patent application Ser. No. 08/352,651, and the decoder 84 contains like elements as the DC compensator 90 for identifying the DC compensating codeword. For purposes of extracting the information from the PCM codewords recovered by the decoder 84, the decoder 84 discards the sign bit of the DC compensating codeword and retains the magnitude field of the DC compensating codeword.

It is to be understood that alternative rules may be utilized by the encoder 72 and the decoder 84 to select the PCM codeword containing the usurped bit. For example, the DC compensating codeword may be assigned as the PCM codeword whose magnitude field produces the second largest magnitude linear or analog signal or the last largest magnitude linear or analog signal, rather than the first largest magnitude linear or analog signal. The architecture of the DC compensator 90 and the decoder 84 may be modified by those skilled in the art to implement alternative rules.

Upon reviewing the foregoing, it will become apparent that the sorter 94, minimum index register 96, comparer 98 and counter 100 form a sequential comparator that may be readily implemented using a digital signal processor or microprocessor. It is to be understood that a parallel input sorter may alternatively be used to identify the location and magnitude of the DC compensating codeword. A digital signal processor or microprocessor may also be utilized by those skilled in the art to implement the converter 100, integrator 118 and sign extractor 120.

By selecting the largest of n samples instead of every nth sample, the preferred embodiments may advantageously provide DC compensating codewords having a larger average magnitude in terms of their resulting linear voltage values. As a consequence, a wider bandwidth null at DC may be achieved for a given frame size. Moreover, the preferred embodiments provide the benefit of DC compensation codewords that are randomized in location within a series of frames. As a result of the randomized location of the DC compensation codeword within the frame, the encoder may not produce undesirable spectral peaks, such as the spectral peaks shown in FIG. 3A.

In an alternative embodiment, the decoder 84 likewise integrates the codewords that it decides were transmitted from the encoder 72 and predicts what the encoder 72 is going to do with each unsigned codeword. If the encoder 72 violates the rule, for example in order to signal a control frame, by doing the opposite of what the decoder 84 expects, then the decoder 84 may detect the rule violation and respond accordingly. For example, in this manner, the encoder 72 may signal speed switches, diagnostics, etc., without disrupting data transmission.

The encoder 72 and demodulator 70 may be incorporated into a client device that has digital connectivity to the digital telephone network 76. Alternatively, the encoder 72 and demodulator 70 may operate in a server or hub environment. In the server environment, the encoder 72 and demodulator 70 act as a server interface to the digital telephone network 76. In the hub environment, the encoder 72 and the demodulator 70 likewise act as an interface to the digital telephone network 76. U.S. Pat. Nos. 5,528,595 and 5,577,105, both of which issued to U.S. Robotics, Inc. and which are incorporated herein by reference, show a network access server that may act as an interface to the digital telephone network 76. Preferably, a DSP modem in the network access server may be configured to perform the functions of the encoder 72, as described above.

Figure 6A:
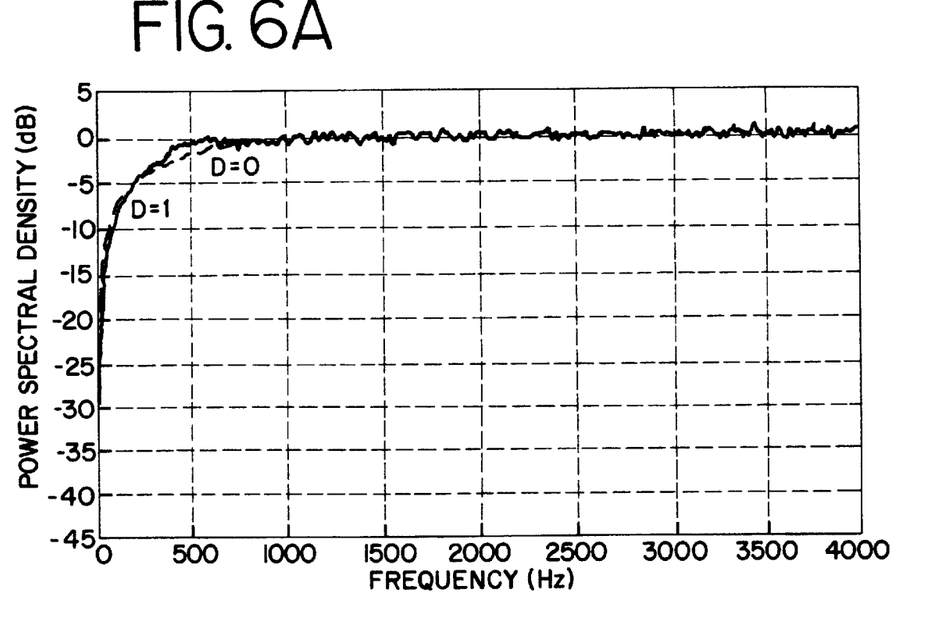
FIGS. 6A and 6B show a simulated spectral output of an encoder that utilizes a DC compensator as shown in FIG. 5.
Figure 6B:
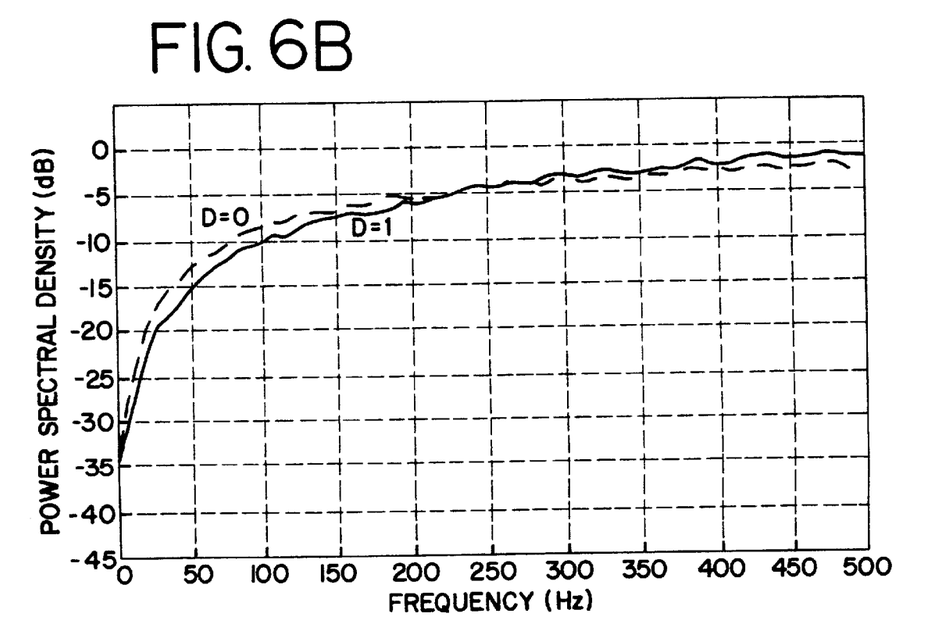

FIGS. 6A and 6B show a simulated power spectral density with respect to frequency for an encoder that utilizes a DC compensator 90 as shown in FIG. 5. The DC compensator 90 used in the simulation for FIGS. 6A and 6B follows the rule of selecting the largest sample in a frame of six samples as the DC compensation codeword. Results are provided for two cases: the dashed line (D=0) shows the results of utilizing an extended running digital sum that includes previously transmitted codewords and one six symbol frame in the frame buffer 92; the solid line (D=1) shows the results of including an additional frame in the extended running digital sum by looking ahead one frame, as described above. The simulation results are based upon 131,070 random symbols taken from a symbol constellation corresponding to a data rate of 53.3 kbps. The power spectrum was generated using a half overlap periodogram employing a 1024 point fft with Hanning window.

In comparison with FIG. 3A, FIG. 6A shows a flatter spectral output. In particular, the DC compensator 90 does not produce the periodic spectral peaks shown in FIG. 3A. In addition, as is best shown by comparing FIG. 6B to FIG. 3B, the DC compensator 90 advantageously provides a wider and deeper spectral null at DC and very low frequencies. The spectral shaping method and apparatus described herein provide improved spectral shaping with low latency, low complexity and no error propagation.

The DC compensator 90, shown in FIG. 5, may be utilized to implement alternative or additional spectral shaping techniques. The methods described herein may be readily extended by those skilled in the art to utilize more than one bit per frame, Nyquist shaping, and different spectral shaping characteristics may be obtained by altering the weighting function or by introducing leakage into the running digital sum. For example, the compensator 90 may identify the two largest samples in a frame of PCM codewords and assign sign bits to both samples to minimize two aspects of the signal spectrum, such as low frequency and high frequency. In this case, the compensator 90 would utilize two weighting functions of the linear values of previously transmitted PCM codewords. One function may be the running digital sum, which may be utilized to reduce low frequency components as described above. The other function may alternate the sign of every other PCM codeword as it is accumulated, which would tend to minimize energy at the Nyquist frequency (4000 Hz in the case of the telephone network 76).

It is intended that the foregoing detailed description be regarded as illustrative rather than limiting. Other embodiments, which may embody the principles of the present invention, may be readily devised by those skilled in the art in light of the foregoing. Accordingly, it is to be understood that the DC compensation method and apparatus described herein are not limited to the specific illustrations provided, but may assume other embodiments limited only by the scope of the following claims, including all equivalents thereto.

We claim:

1. An improved DC compensation method comprising the steps of:

defining a frame that includes at least two unsigned codewords;

identifying an unsigned compensating codeword that is randomly located within the frame by applying a rule to the at least two unsigned codewords, wherein said step of identifying the unsigned compensating codeword comprises the steps of:

sorting the codewords in the frame to locate a largest sample in the frame; and storing an index corresponding to a location of the largest sample in the frame; and appending a sign bit to the unsigned compensating codeword, wherein the sign bit is selected to oppose an integration of linear values associated with previously transmitted codewords.

2. A method as claimed in claim 1, further comprising the steps of:

comparing the stored index to a number provided by a counter, said counter counting periods of an 8000 Hz clock; and appending the sign bit to the unsigned compensating codeword when the index is equal to the number.

3. An encoder having an improved DC compensator, the encoder comprising:

means for storing a stream of unsigned codewords;

means for sorting the stored codewords, wherein said sorting means is operable to identify a selected codeword from the stored codewords in accordance with a rule;

means for appending a sign bit to the selected codeword, thereby forming a compensating codeword; and means for transmitting the compensating codeword to a digital telephone network.

4. An encoder as claimed in claim 3, wherein said storing means comprises a frame buffer.

5. An encoder as claimed in claim 3, further comprising means for storing a plurality of sign bits.

6. An encoder as claimed in claim 4, wherein said sign bit storing means is coupled to said appending means.

7. An encoder as claimed in claim 3, wherein said rule comprises selecting a codeword from the stored stream of unsigned codewords in which the selected codeword has a first largest magnitude field.

8. An encoder as claimed in claim 3, further comprising means for computing a running digital sum of values associated with each transmitted codeword.

9. An encoder as claimed in claim 8, wherein said computing means comprises:

a converter coupled to the appending means;

an integrator coupled to the converter; and an inverter coupled to the integrator.

10. An encoder as claimed in claim 9, wherein said compensating codeword is a PCM codeword and said converter is a PCM to linear converter.

11. In a communication system having a client device with a decoder that is coupled by an analog subscriber line to a digital telephone network and an encoder that is digitally connected to the digital telephone network, a spectral shaping apparatus comprising:

a frame buffer that stores a stream of unsigned codewords;

a sorter coupled to said frame buffer, said sorter being operable to identify a selected codeword from the stored stream of codewords by applying a spectral shaping rule; and a register coupled to the sorter, the register being operable to store an index representing a location of the selected codeword within the frame buffer.

12. A spectral shaping apparatus as claimed in claim 11, wherein said stream of unsigned codewords is of a predetermined length.

13. A spectral shaping apparatus as claimed in claim 12, wherein said predetermined length is twelve codewords.

14. A spectral shaping apparatus as claimed in claim 11, further comprising a combiner having two inputs, wherein a first input to said combiner is coupled to said frame buffer and a second input to said combiner is coupled to a second buffer.

15. A spectral shaping apparatus as claimed in claim 11, further comprising an analog-to-digital converter coupled between said analog subscriber line and said frame buffer.

* * * * *